United States Patent
Bhattacharyya et al.

(10) Patent No.: US 10,038,778 B1
(45) Date of Patent: Jul. 31, 2018

(54) LOCALLY SECURING SENSITIVE DATA STORED ON A MOBILE PHONE

(71) Applicant: Symantec Corporation, Mountain View, CA (US)

(72) Inventors: Debanjan Bhattacharyya, Pune (IN); Vipul Sawant, Pune (IN)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 15/468,828

(22) Filed: Mar. 24, 2017

(51) Int. Cl.
*H04M 1/66* (2006.01)
*H04M 1/725* (2006.01)
*H04W 8/18* (2009.01)
*H04W 12/06* (2009.01)
*H04W 12/08* (2009.01)
*G06F 21/62* (2013.01)
*G06F 21/60* (2013.01)

(52) U.S. Cl.
CPC ...... *H04M 1/72577* (2013.01); *G06F 21/602* (2013.01); *G06F 21/6245* (2013.01); *H04M 1/72522* (2013.01); *H04W 8/183* (2013.01); *H04W 12/06* (2013.01); *H04W 12/08* (2013.01)

(58) Field of Classification Search
CPC .... G06F 21/32; G06F 21/602; G06F 21/6245; G06F 2221/034; G06F 2221/2105; G06F 2221/2149; G06F 9/4451; H04W 8/183; H04W 12/06; H04W 12/08; H04W 4/16; H04W 88/02; H04M 1/725; H04M 1/72577; H04L 63/0861; H04L 63/10; H04L 63/0428; H04L 63/20; H04L 63/08

USPC ................ 455/411, 412.2, 41.3; 1/1; 705/65
See application file for complete search history.

(56) References Cited

U.S. PATENT DOCUMENTS 8,655,307 B1 * 2/2014 Walker ............. H04W 52/0212
455/405
2008/0014869 A1 * 1/2008 Demirbasa ............. H04M 1/67
455/41.2

(Continued)

FOREIGN PATENT DOCUMENTS

CN 103955638 A * 7/2014
CN 104575537 A * 4/2015

(Continued)

OTHER PUBLICATIONS

Avast Software s.r.o., "Avast Anti-Theft", Webpage, accessed Mar. 24, 2017, https://www.avast.com/en-in/anti-theft-features.

*Primary Examiner* — Mahendra Patel
(74) *Attorney, Agent, or Firm* — Maschoff Brennan

(57) ABSTRACT

Locally securing sensitive data stored on a mobile phone. In one embodiment, a computer-implemented method for locally securing sensitive data stored on a mobile phone may be performed, at least in part, by a computing device including at least one processor. The method may include operating a mobile phone in an owner mode. The method may also include locally detecting, by the mobile phone, an insecurity event on the mobile phone. The method may further include, in response to locally detecting the insecurity event on the mobile phone, automatically switching, by the mobile phone, to operating the mobile phone in a guest mode, with the automatic switching to operating the mobile phone in the guest mode resulting in automatically securing sensitive data stored locally on the mobile phone.

17 Claims, 3 Drawing Sheets

(56) References Cited

U.S. PATENT DOCUMENTS

| | | | | |
|---|---|---|---|---|
| 2009/0253410 A1* | 10/2009 | Fitzgerald | ............... | G06F 21/88 |
| | | | | 455/411 |
| 2013/0017862 A1* | 1/2013 | Lee | .................... | H04W 60/005 |
| | | | | 455/558 |
| 2014/0120961 A1* | 5/2014 | Buck | ....................... | H04W 4/12 |
| | | | | 455/466 |
| 2014/0188734 A1* | 7/2014 | Neuwirth | ............. | G06Q 20/382 |
| | | | | 705/65 |
| 2014/0335833 A1* | 11/2014 | Woloshyn | ............ | G06F 3/0488 |
| | | | | 455/412.2 |
| 2016/0044490 A1* | 2/2016 | Yang | .................... | H04W 8/183 |
| | | | | 455/411 |
| 2016/0205082 A1* | 7/2016 | Puderer | .................... | G06F 8/61 |
| | | | | 713/165 |
| 2017/0076080 A1* | 3/2017 | Hao | ........................ | G06F 21/32 |
| 2017/0098351 A1* | 4/2017 | Modi | ..................... | G08B 13/08 |
| 2017/0346851 A1* | 11/2017 | Drake | ................ | H04L 63/1466 |

FOREIGN PATENT DOCUMENTS

| | | | | | |
|---|---|---|---|---|---|
| CN | | 104980557 A | * | 10/2015 | |
| CN | | 105320870 A | * | 2/2016 | |
| CN | | 105373737 A | * | 3/2016 | |
| WO | WO 2016054890 A1 | * | 4/2016 | ............. | G06F 21/32 |

\* cited by examiner

LOCALLY SECURING SENSITIVE DATA STORED ON A MOBILE PHONE

BACKGROUND

The capabilities of mobile phones have evolved over time from simply being able to make phone calls to additionally being able to perform a myriad of tasks for a user. For example, mobile phones are capable of running applications (also referred to as apps) which are designed to assist a user with many aspects of daily life. Some common applications found on mobile phones include applications for telephone calls, Short Message Service (SMS) messaging, calendars, email, music, gaming, navigation, social media, video conferencing, and taking photographs and videos. The use of applications on a mobile phone results in large amounts of personal data being stored on the mobile phone. Further, much of this data is sensitive data to which the owner would not want an unauthorized person to gain access.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for locally securing sensitive data stored on a mobile phone may be performed, at least in part, by a computing device including at least one processor. The method may include operating a mobile phone in an owner mode. The method may also include locally detecting, by the mobile phone, an insecurity event on the mobile phone. The method may further include, in response to locally detecting the insecurity event on the mobile phone, automatically switching, by the mobile phone, to operating the mobile phone in a guest mode, with the automatic switching to operating the mobile phone in the guest mode resulting in automatically securing sensitive data stored locally on the mobile phone.

In some embodiments, the insecurity event may include removal of an authorized Subscriber Identity Module (SIM) card from the mobile phone, the mobile phone losing network connectivity, or receipt of an authenticated request to place the mobile phone in the guest mode from a user local to the mobile phone. Also, in some embodiments, the sensitive data may include sensitive files stored locally on the mobile phone, and the sensitive files may be automatically secured by at least partially encrypting the sensitive files or by modifying file permissions of the sensitive files. Further, in some embodiments, the sensitive data may include sensitive applications stored locally on the mobile phone, and operating the mobile phone in the guest mode prevents the mobile phone from running the sensitive applications, thereby resulting in the automatic securing of the sensitive data.

Also, in some embodiments, the method may further include locally detecting, by the mobile phone, a security event on the mobile phone while operating the mobile phone in the guest mode and in response to locally detecting the security event on the mobile phone, automatically switching, by the mobile phone, back to operating the mobile phone in the owner mode, with the switching back to operating the mobile phone in the owner mode resulting in automatically unsecuring the sensitive data stored locally on the mobile phone. In some embodiments, the security event may include insertion of an authorized SIM card into the mobile phone or receipt of an authenticated request to place the mobile in the owner mode from a user local to the mobile phone.

Further, in some embodiments, one or more non-transitory computer-readable media, such as that of a mobile phone, may include one or more computer-readable instructions that, when executed by one or more processors of the mobile phone, cause the mobile phone to perform the method for locally securing sensitive data stored on the mobile phone.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
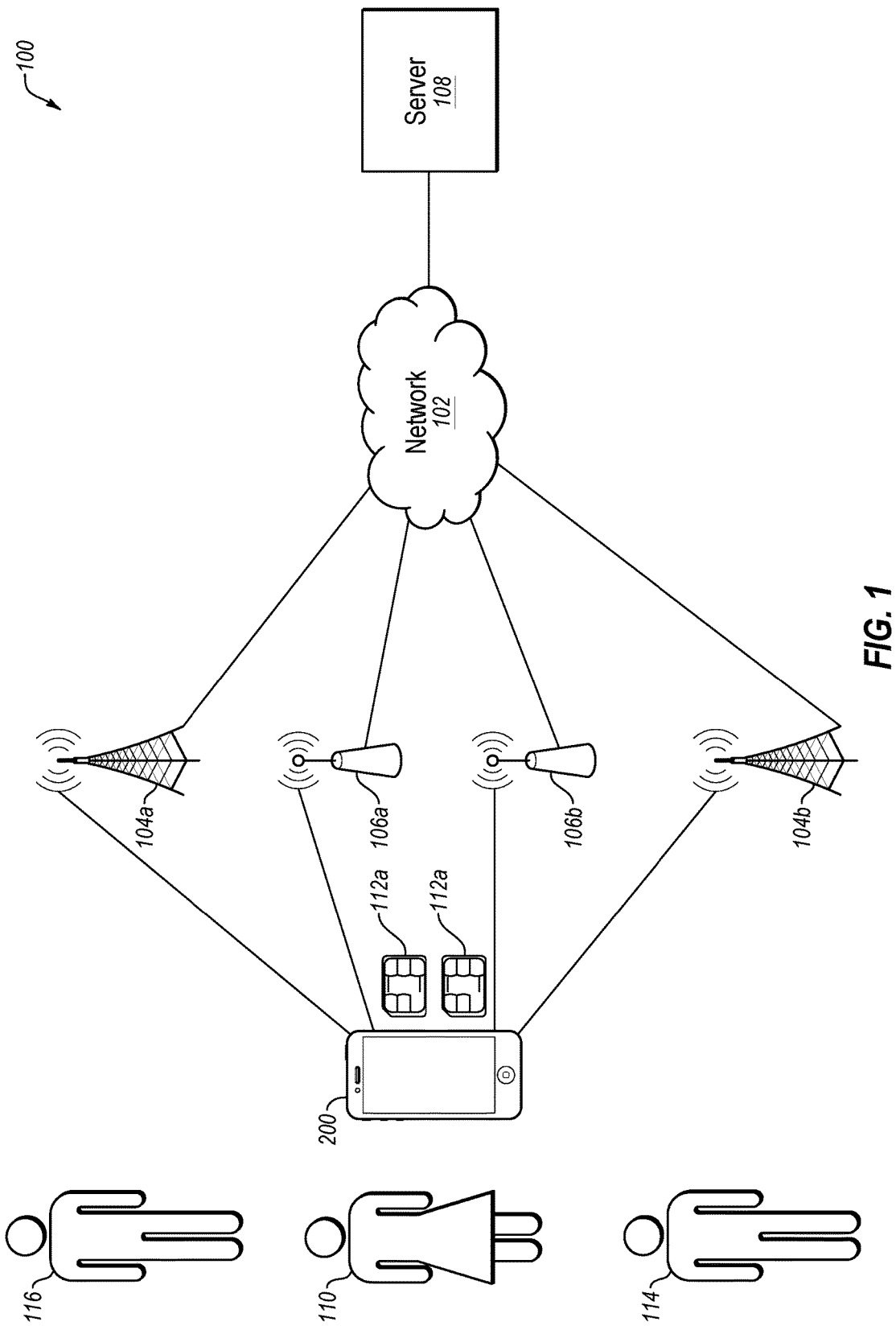
FIG. 1 illustrates an example system having an example mobile phone configured to locally secure sensitive data stored on the mobile phone.

Some embodiments in this disclosure relate to locally securing sensitive data stored on a mobile phone.

The protection of sensitive data stored on a mobile phone such as, e.g., sensitive files, data structures, passwords, or applications, may be achieved using a login screen. A login screen may require a user to correctly enter a password, or other indicia authenticating ownership of the mobile phone such as a fingerprint or other biometric data, before most, if not all, of the data stored on the mobile phone can be accessed. Also, the protection of sensitive data stored on a mobile phone may also be achieved using a remote lockout. A remote lockout may employ a command sent to a mobile phone, from a device remote from the mobile phone, to lock down the mobile phone when it is discovered that the mobile phone has possibly fallen into the hands of an unauthorized user, thereby preventing the unauthorized user from accessing most, if not all, of the data stored on the mobile phone. Further, the protection of sensitive data stored on a mobile phone may also be achieved using a remote wipe. A remote wipe may employ a command sent to a mobile phone, from a device remote from the mobile phone, to wipe (delete) sensitive data from the mobile phone when it is discovered that the mobile phone has possibly fallen into the hands of an unauthorized user, thereby preventing any unauthorized user from accessing the sensitive data stored on the mobile phone. While a login screen, a remote lockout, or a remote wipe may be effective in certain circumstances in preventing an unauthorized user from gaining access to sensitive data stored on a mobile phone, in other circumstances these methods may be ineffective at securing sensitive data stored on a mobile phone.

For example, in some situations an unauthorized user may gain access to a mobile phone before the login screen has been activated. For example, this can happen when the login screen becomes activated only after thirty minutes of inactivity, but the mobile phone is unexpectedly stolen by a thief after only five minutes of inactivity. In this example, the login screen would be ineffective at securing the sensitive data stored on the mobile phone from the thief. Further, if the thief intentionally or inadvertently interrupts the network connectivity of the mobile phone, a remote lockout command or a remote wipe command from a remote device cannot reach the mobile phone. Thus, the remote lockout or remote wipe would be unavailable for securing the sensitive data stored on the mobile phone from the thief.

In another example, the owner of a mobile phone may wish to allow another user only limited access to non-sensitive data stored on the mobile phone, without allowing the other user access to sensitive data stored on the mobile phone. For example, this might be the case when the mobile phone is temporarily left with a repair technician to repair a damaged component or temporarily loaned to a friend to simply make a phone call. In this example, the login screen, the remote lockdown, or the remote wipe would undesirably prevent the repair technician or the friend from accessing the non-sensitive data stored on the mobile phone Alternatively, if the login screen, the remote lockout, or the remote wipe is disabled, the repair technician or the friend would have access not only to the non-sensitive data, but also undesirably to the sensitive data.

The embodiments disclosed herein may provide various benefits. In particular, the embodiments disclosed herein may, for example, locally secure sensitive data stored on a mobile phone when the mobile phone is operated in a guest mode. Automatically switching operation of the mobile phone to the guest mode may occur in response to locally detecting an insecurity event on the mobile phone, such as removal of an authorized Subscriber Identity Module (SIM) card from the mobile phone, the mobile phone losing network connectivity, or receipt of an authenticated request to place the mobile phone in the guest mode from a user local to the mobile phone. The sensitive data may include, for example, sensitive files or sensitive applications stored locally on the mobile phone. In some embodiments, sensitive data may be specified by a user of the mobile phone, by another individual, automatically based on the category or type of the data, or some combination thereof.

For example, if a mobile phone is stolen by a thief and the thief removes the SIM card from the mobile phone or causes the mobile phone to lose network connectivity, the mobile phone, configured according to one or more embodiments disclosed herein, may automatically switch from operating in an owner mode to operating in a guest mode, thereby locally securing sensitive data stored on the mobile phone from the thief. In another example, if the owner of a mobile phone desires to temporarily leave the mobile phone with a repair technician to repair a damaged component or desires to temporarily loan the mobile phone to a friend to simply make a phone call, the owner can enter a request to place the mobile phone in the guest mode, thereby locally securing sensitive data stored on the mobile phone from the repair technician or the friend while still allowing the repair technician or the friend to access non-sensitive data stored on the mobile phone, such as a component configuration application or a telephone call application.

Accordingly, the embodiments disclosed herein may be configured to locally secure sensitive data stored on a mobile phone in response to an insecurity event even where a login screen of the mobile phone has not been activated and even where a remote lockout or a remote wipe of the mobile phone is not available due to a lack of network connectivity. Further, the embodiments disclosed herein may be configured to locally secure sensitive data stored on a mobile phone using non-destructive methods. These non-destructive methods may include partial or total encryption, file permissions, application permissions, or other transformation of data, for example, without actually deleting any of the sensitive data. These non-destructive methods may be beneficial over a costly and time-intensive wipe of large amounts of sensitive data from the mobile phone, which may later result in a costly and time-intensive restoration of large amounts of sensitive data to the mobile phone. Further, the embodiments disclosed herein may be configured to maintain storage of sensitive data locally to the mobile phone, which may avoid security risks inherent any time sensitive data is transmitted to a device remote from the mobile phone.

Turning to the figures, FIG. 1 illustrates an example system 100 having an example mobile phone 200 configured to locally secure sensitive data stored on the mobile phone 200. In addition to the mobile phone 200, the system 100 may include a network 102, cell phone towers 104*a* and 104*b*, wireless access points 106*a* and 106*b*, and a server 108.

In some embodiments, the network 102 may be configured to communicatively couple the mobile phone 200 and the server 108. In some embodiments, the network 102 may be any wired or wireless network, or combination of multiple networks, configured to send and receive communications between systems and devices. In some embodiments, the network 102 may include a Local Area Network (LAN), Metropolitan Area Network (MAN), a Wide Area Network (WAN), or a Storage Area Network (SAN). In some embodiments, the network 102 may also be coupled to, or may include, portions of a telecommunications network, including telephone lines, for sending data in a variety of different communication protocols, such as a cellular network, a plain old telephone system (POTS) network, or a Voice over IP (VoIP) network.

In some embodiments, each of the cell phone towers 104*a* and 104*b* may include electronic communications equipment placed on a raised structure. The raised structure may support, for example, antennae and one or more sets of transmitter/receivers, transceivers, digital signal processors, control electronics, a GPS receiver for timing (such as in CDMA2000/IS-95 or GSM systems), primary and backup electrical power sources, and sheltering. Each of the cell phone towers 104*a* and 104*b* may be employed to connect the mobile phone 200 to other similar devices through the network 102, as well as to the server 108 and other similar servers through the network 102. Each of the cell phone towers 104*a* and 104*b* may be associated with a cell, and each cell may have a physical range within which wireless connections can be made between a device and each of the cell phone towers 104*a* and 104*b*. When the mobile phone 200 is physically moved out of the range of the cells of the cell phone towers 104*a* and 104*b*, and other similar cell phone towers, the mobile phone may lose network connectivity to the server 108 through the network 102.

In some embodiments, each of the wireless access points 106*a* and 106*b* may be a networking hardware device that allows the mobile phone 200 to wirelessly connect to the server 108 through the network 102, such as over a Wi-Fi wireless connection or a Bluetooth wireless connection. Each of the wireless access points 106*a* and 106*b* may be associated with a hotspot, and each hotspot may have a physical range within which wireless connections can be made between a device and each of the wireless access points 106*a* and 106*b*. When the mobile phone 200 is physically moved out of the range of the hotspots of the wireless access points 106*a* and 106*b*, and other similar wireless access points, the mobile phone 200 may lose network connectivity to the server 108 through the network 102.

In some embodiments, the server 108 may include any configuration of hardware and software configured to perform a task. For example, the server 108 may include multiple computing systems, such as multiple servers that each include memory and at least one processor, which are networked together, such as in a cloud computing environment, a multitenancy environment, or a virtualization environment, and configured to facilitate communication sessions between the mobile phone 200 and other similar devices. In some embodiments, the server 108 may operate as an exchange configured to establish communication sessions, such as telephone calls, video calls, and data sharing sessions between devices such as the mobile phone 200 and another device or devices, among other operations.

In some embodiments, the mobile phone 200 may be any computing device capable of functioning as a mobile phone, as discussed in connection with FIG. 2. For example, the mobile phone 200 may include one or more processors and one or more non-transitory computer-readable media comprising one or more computer-readable instructions that, when executed by the one or more processors, are configured to perform operations as described in this disclosure, among other operations.

As disclosed in FIG. 1, an owner 110 may have access to the mobile phone 200 and may be associated with an authorized SIM card 112*a*. A guest 114 may also at times be granted authorized access to the mobile phone 200 and a thief 116 may unexpectedly gain unauthorized access to the mobile phone 200, and either may be associated with an unauthorized SIM card 112*b*.

In some embodiments, the mobile phone 200 may be configured to locally secure sensitive data stored on a mobile phone 200 when the mobile phone is switched from operating in an owner mode to operating in a guest mode, such as in response to a request by the owner 110, in response to removal of the authorized SIM card 112*a* from the mobile phone 200 (such as by the owner 110, the guest 114, or the thief 116), or response to the mobile phone 200 losing network connectivity with the server 108 through the network 102. This network connectivity may be lost because the network connectivity is intentionally interrupted (such as by the thief 116), or because the mobile phone 200 is moved out of range of a wireless connection, such as being moved out of the range of the cell of one of the cell phone towers 104*a* and 104*b* or out of the range of a hotspot of one of the wireless access points 106*a* and 106*b* (such as by the thief 116). Once switched to operating in the guest mode, sensitive data stored on the mobile phone 200, such as sensitive files or sensitive applications stored locally on the mobile phone 200, may be locally secured such that they cannot be accessed.

Modifications, additions, or omissions may be made to the system 100 without departing from the scope of the present disclosure. For example, in some embodiments, the mobile phone 200 may be connected to the network 102 through devices or connections other than the cell phone towers 104*a* and 104*b* and other than the wireless access points 106*a* and 106*b*, including additional cell phone towers and additional wireless access points, and/or additional wired or wireless connections. Therefore, achieving network connectivity with the server 108 through the network 102 may occur through other wired or wireless devices. Alternately or additionally, in some embodiments, the system 100 may include additional devices similar to the devices illustrated in FIG. 1 that each may be configured similarly to the devices illustrated in FIG. 1.

Figure 2:
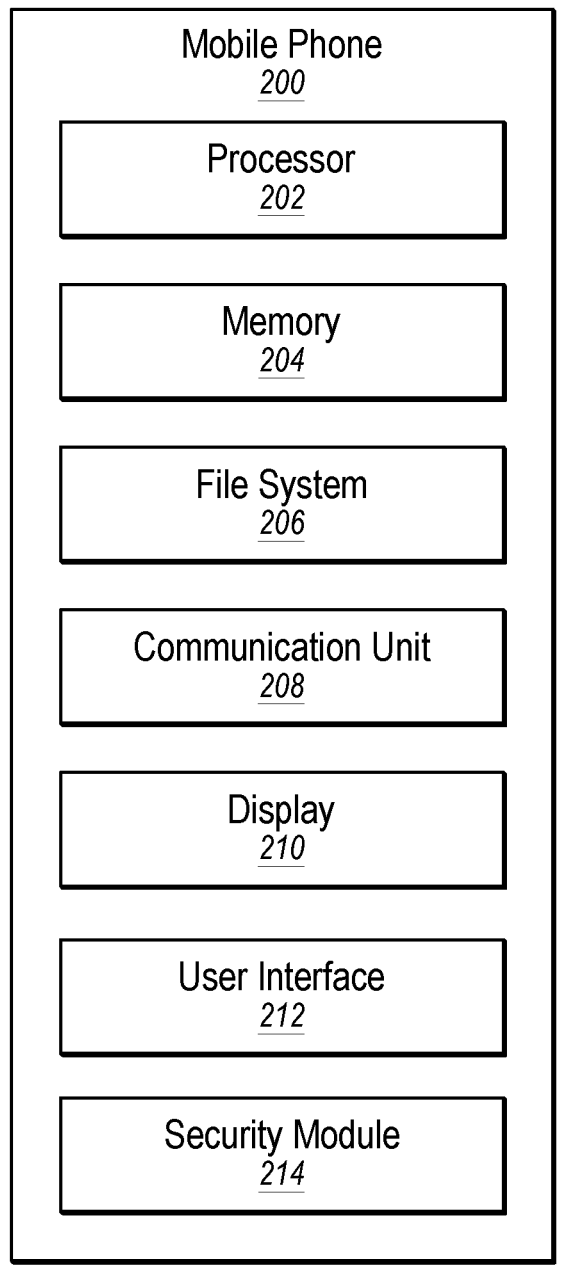
FIG. 2 illustrates an example mobile phone that may be used in locally securing sensitive data stored on the mobile phone.

FIG. 2 illustrates the example mobile phone 200 that may be used in locally securing sensitive data stored on the mobile phone 200. In some embodiments, the mobile phone 200 may include a processor 202, a memory 204, a file system 206, a communication unit 208, a display 210, a user interface 212, and a security module 214, which all may be communicatively coupled. In some embodiments, the mobile phone 200 may be any computing device capable of functioning as a mobile phone, such as a laptop computer, a smartphone, a tablet computer, a portable music player, or any other mobile computing device.

Generally, the processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 202 may interpret and/or execute program instructions and/or process data stored in the memory 204, the file system 206, or some combination thereof. In some embodiments, the processor 202 may fetch program instructions from the file system 206 and load the program instructions into the memory 204. After the program instructions are loaded into the memory 204, the processor 202 may execute the program instructions. In some embodiments, the instructions may include the processor 202 locally securing sensitive data stored on a mobile phone 200.

The memory 204 and the file system 206 may include computer-readable storage media for carrying or having computer-executable instructions or data structures stored thereon. Such computer-readable storage media may be any available non-transitory media that may be accessed by a general-purpose or special-purpose computer, such as the processor 202. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media, such as a SIM card and associated SIM card slot, which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations, such as one or more blocks of the method 300 of FIG. 3. These computer-executable instructions may be included, for example, in one or more operating systems, in one or more applications, or in some combination thereof.

The communication unit 208 may include any component, device, system, or combination thereof configured to transmit or receive information over a network. In some embodiments, the communication unit 208 may communicate with other devices at other locations, the same location, or even other components within the same system. For example, the communication unit 208 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 208 may permit data to be exchanged with a network and/or any other devices or systems, such as those described in the present disclosure.

The display 210 may be configured as one or more displays, such as an LCD, LED, or other display. The display 210 may be configured to present video, text, application user interfaces, and other data as directed by the processor 202.

The user interface 212 may include any device configured to allow a user to interface with the mobile phone 200. For example, the user interface 212 may include a mouse, a track pad, a keyboard, a touchscreen, volume controls, other buttons, a telephone keypad, a speaker, a microphone, a camera, any peripheral device, or other input or output device. The user interface 212 may receive input from a user, such as the owner 110, the guest 114, or the thief 116 of FIG. 1, and provide the input to the processor 202. Similarly, the user interface 212 may present output to a user.

Figure 3:
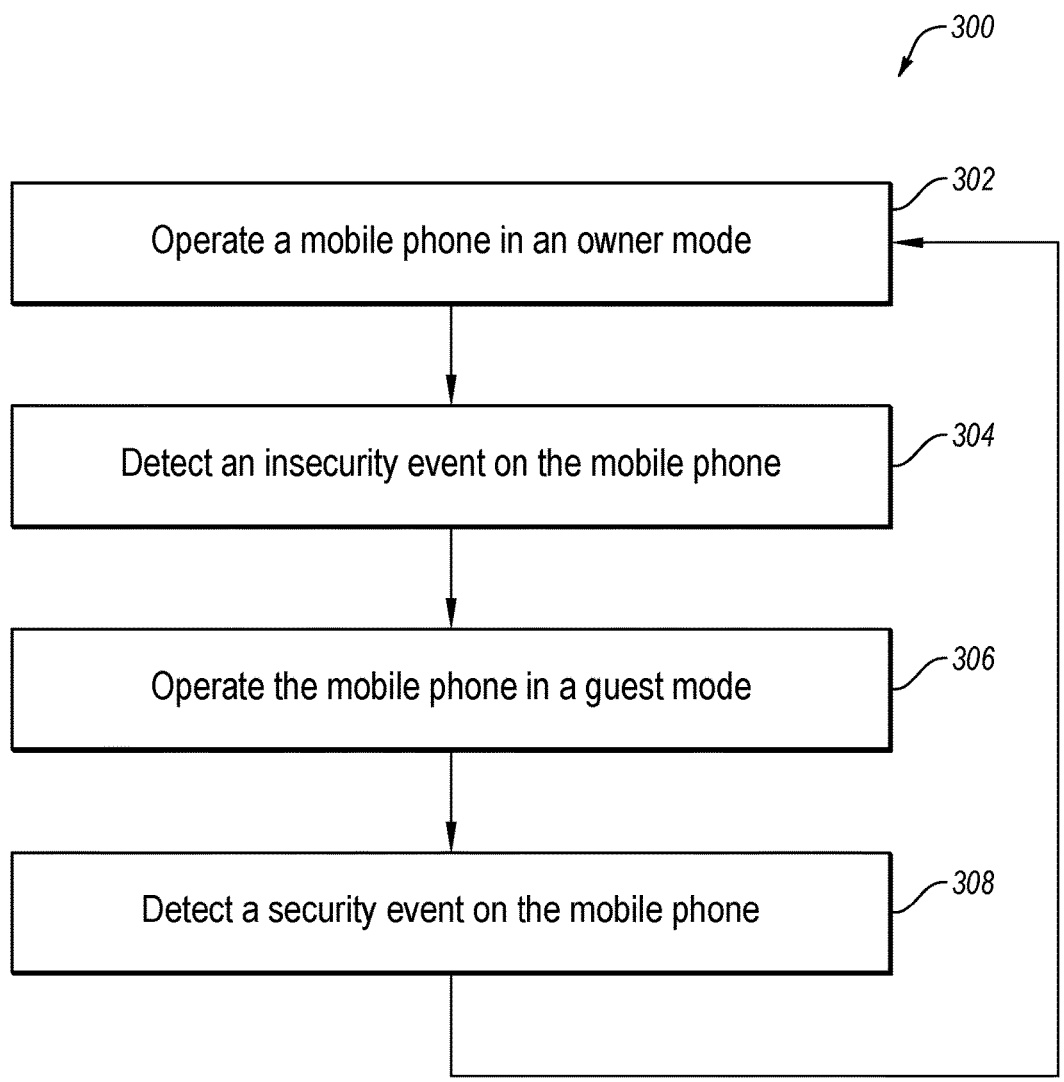
FIG. 3 is a flowchart of an example method for locally securing sensitive data stored on the mobile phone.

The security module 214 may be one or more computer-readable instructions stored on one or more non-transitory computer-readable media, such as the memory 204 or the file system 206, that, when executed by the processor 202, is configured to perform a method for locally securing sensitive data stored on a mobile phone 200, such as one or more blocks of the method 300 of FIG. 3. In some embodiments, the security module 214 may be part of an operating system of the mobile phone 200, may be part of an application of the mobile phone 200, or may be some combination thereof. In some embodiments, the security module 214 may possess permission to: read a SIM card, read or write to any folder of the file system 206, close files and applications, alter file permissions and application permissions, always be running and never be deactivated, or some combination thereof. In some embodiments, the security module 214 may be active and running any time the mobile phone 200 is powered on, such as where the security module 214 is the first application to load upon a booting of an operating system of the mobile phone 200. Further, upon booting, the security module 214 may be configured to automatically place the mobile phone 200 in a guest mode to avoid an unauthorized user from accessing sensitive data stored on the mobile phone by simply rebooting the mobile phone 200.

Modifications, additions, or omissions may be made to the mobile phone 200 without departing from the scope of the present disclosure. For example, although each is illustrated as a single component in FIG. 2, any of the components 202, 204, 206, 208, 210, 212, and 214 of the mobile phone 200 may include multiple similar components that function collectively and are communicatively coupled.

FIG. 3 is a flowchart of an example method 300 for locally securing sensitive data stored on the mobile phone. The method 300 may be performed, in some embodiments, by a device or system, such as the mobile phone 200. In these and other embodiments, the method 300 may be performed by one or more processors based on one or more computer-readable instructions stored on one or more non-transitory computer-readable media. The method 300 will now be described in connection with FIGS. 1, 2, and 3.

At block 302, a mobile phone may be operated in an owner mode. In some embodiments, the owner mode may enable sensitive data stored on the mobile phone to be accessed. In some embodiments, the sensitive data may include sensitive files stored locally on the mobile phone and/or sensitive applications stored locally on the mobile phone, including data associated with the sensitive files or applications such as passwords to the sensitive files or applications.

For example, the security module 214 of the mobile phone 200 of FIG. 2 may, at block 302, operate the mobile phone 200 in an owner mode in which sensitive data stored in the memory 204 or the file system 206 of the mobile phone 200 may be accessed by a user of the mobile phone 200, such as the owner 110 of FIG. 1.

At block 304, an insecurity event may be detected on the mobile phone. At block 306, the mobile phone may be operated in a guest mode. In some embodiments, the mobile phone may be automatically switched, at block 306, from operating in the owner mode to operating in the guest mode in response to the local detection, at block 304, of the insecurity event on the mobile phone.

In some embodiments, the operating of the mobile phone in the guest mode at block 306 results in automatically securing sensitive data stored locally on the mobile phone. In some embodiments, the insecurity event may include removal of an authorized SIM card from the mobile phone, the mobile phone losing network connectivity, or receipt of an authenticated request to place the mobile phone in the guest mode from a user local to the mobile phone. Further, in some embodiments, where the sensitive data includes files stored locally on the mobile phone, the sensitive files may be automatically secured by at least partially encrypting the sensitive files or by modifying file permissions of the sensitive files. Also, in some embodiments, where the sensitive data includes sensitive applications stored locally on the mobile phone, the sensitive applications may be automatically secured by preventing the mobile phone from running the sensitive applications.

For example, the security module 214 of the mobile phone 200 of FIG. 2 may, at block 304, detect an insecurity event on the mobile phone 200. Then, in response to detecting the insecurity event, the security module 214 may automatically switch, at block 306, to operating the mobile phone 200 in a guest mode. This automatic switch from the owner mode to the guest mode may result in the security module 214 automatically securing sensitive data stored locally on the mobile phone 200, such as sensitive data stored in the memory 204 or the file system 206 of the mobile phone 200.

The insecurity event detected by the security module 214 at block 304 may include removal of the authorized SIM card 112a of FIG. 1 from the mobile phone 200, such as where the guest 114 (e.g., a repair technician) or the thief 116 removes the authorized SIM card 112a to insert the unauthorized SIM card 112b into the mobile phone. Additionally or alternatively, the insecurity event detected by the security module 214 at block 304 may include the mobile phone 200 losing network connectivity with the server 108, such as where the thief 116 physically moves the mobile phone 200 out of the range of the cells of the cell phone towers 104a and 104b and other similar cell phone towers, or out of the range of the hotspots of the wireless access points 106a and 106b and other similar wireless access points, and thereby the mobile phone 200 loses network connectivity to the server 108 through the network 102. Additionally or alternatively, the insecurity event detected by the security module 214 at block 304 may include the security module 214 receiving an authenticated request to place the mobile phone 200 in the guest mode from the owner 110, which may include receiving a guest mode password or guest mode biometric data from the owner 110, while the owner 110 is local to the mobile phone 200, such as through the user interface 212 of the mobile phone 200. This may occur just before the owner 110 intentionally hands the mobile phone 200 over to the guest 114, such as where the guest 114 is a repair technician hired to repair a damaged component of the mobile phone 200 without needing to access sensitive data stored on the mobile phone 200, or where the guest 114 is a friend who simply wants to make a phone call on the mobile phone 200 without needing to access sensitive data stored on the mobile phone 200.

The automatic securing of sensitive data by the security module 214 at block 306 may be performed locally on the mobile phone 200 using partial or total encryption, file permissions, application permissions, or other transformation of data, for example, without actually deleting any of the sensitive data. In this manner, a brief switch to the guest mode and then back to the owner mode may not result in a costly and time-intensive deletion of large amounts of sensitive data and then a subsequent costly and time-intensive restoration of large amounts of sensitive data.

At block 308, a security event may be detected on the mobile phone and then the method 300 may return to block 302. In some embodiments, the mobile phone may be automatically switched, at block 302, from operating in the guest mode back to operating in the owner mode in response to the local detection, at block 308, of the security event on the mobile phone.

In some embodiments, the switching back to operating the mobile phone in the owner mode at block 302 results in automatically unsecuring the sensitive data stored locally on the mobile phone. In some embodiments, the security event may include insertion of an authorized SIM card into the mobile phone or receipt of an authenticated request to place the mobile phone in the owner mode from a user local to the mobile phone.

For example, the security module 214 of the mobile phone 200 of FIG. 2 may, at block 308, detect a security event on the mobile phone 200. Then, in response to the security event, the security module 214 may automatically switch back, at block 302, to operating the mobile phone 200 in the owner mode. This automatic switch from the guest mode to the owner mode may result in the security module 214 automatically unsecuring the sensitive data stored locally on the mobile phone 200.

The security event detected by the security module 214 at block 308 may include insertion, or reinsertion, of the authorized SIM card 112a of FIG. 1 into the mobile phone 200, such as where the owner has regained physical possession of the mobile phone from either the guest 114 or the thief 116 and reinserts the authorized SIM card 112a into the mobile phone 200. Additionally or alternatively, the security event detected by the security module 214 at block 304 may include the security module 214 receiving an authenticated request to place the mobile phone 200 in the owner mode from the owner 110, which may include receiving an owner mode password (which may be different from the guest mode password) or owner mode biometric data (which may be different from the guest mode biometric data) from the owner 110, while the owner 110 is local to the mobile phone 200, such as through the user interface 212 of the mobile phone 200. This may occur just after the owner 110 receives the mobile phone 200 back from the guest 114, such as where the guest 114 is a repair technician who has finished repairing a damaged component of the mobile phone 200, or where the guest 114 is a friend who has finished making a phone call on the mobile phone 200.

The automatic unsecuring of sensitive data by the security module 214 at block 302 may be performed locally on the mobile phone 200 using partial or total decryption, file permissions, application permissions, or other transformation of data, for example, without actually having to restore any of the sensitive data to the mobile phone 200 from another device. In this manner, a brief switch to the guest mode and then back to the owner mode may not result in a costly and time-intensive deletion of large amounts of sensitive data and then a subsequent costly and time-intensive restoration of large amounts of sensitive data.

Although the blocks of the method 300 are illustrated in FIG. 3 as discrete blocks, various blocks may be divided into additional blocks, combined into fewer blocks, reordered, expanded, or eliminated, depending on the desired implementation. For example, in some embodiments, the blocks 306 and 308 may be performed before the blocks 302 and 304. Further, in some embodiments, the block 306 may be performed in isolation from the blocks 302, 304, and 308.

Further, it is understood that the method 300 may improve the functioning of a mobile phone. For example, the functioning of the mobile phone 200 of FIGS. 1 and 2 may itself be improved by the method 300 at least because the mobile phone 200 may be configured to operate in a guest mode in which sensitive data stored locally on the mobile phone 200 is automatically secured. For example the method 300 may be employed to automatically switch the mobile phone 200 to operate in a guest mode to secure sensitive data of the owner 110 stored locally on the mobile phone 200 from the guest 114 and/or from the thief 116. In this manner, the owner 110 may automatically avoid her sensitive data from being inadvertently exposed, unlike conventional mobile phones where login screens, remote lockout features, and remote wipe features are ineffective in certain circumstances in securing sensitive data stored on the mobile phone, resulting in the sensitive data being accessed by an unauthorized user of the mobile phone.

Also, the method 300 may improve the technical field of telecommunications. For example, the technical field of telecommunications may be improved by the method 300 at least because conventional mobile phones do not enable locally securing sensitive data stored on a mobile phone to avoid the sensitive data from being accessed by an unauthorized user. The ability of the mobile phone disclosed herein to operate in a guest mode may avoid sensitive data from being accessed by an unauthorized user.

As indicated above, the embodiments described herein may include the use of a special purpose or general purpose computer (e.g., the processor 202 of FIG. 2) including various computer hardware or software modules, as discussed in greater detail below. Further, as indicated above, embodiments described herein may be implemented using computer-readable media (e.g., the memory 204 or file system 206 of FIG. 2) for carrying or having stored thereon computer-executable instructions or data structures.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for locally securing sensitive data stored on a mobile phone, at least a portion of the method being performed by a computing device comprising at least one processor, the method comprising:
   operating a mobile phone in an owner mode;
   locally detecting, by the mobile phone, an insecurity event on the mobile phone, the insecurity event comprising removal of an authorized Subscriber Identity Module (SIM) card from the mobile phone and the mobile phone losing network connectivity while the mobile phone remains powered on;
   in response to locally detecting the insecurity event on the mobile phone, automatically switching, by the mobile phone, to operating the mobile phone in a guest mode, the automatic switching to operating the mobile phone in the guest mode resulting in automatically securing sensitive data stored locally on the mobile phone, the sensitive data comprising sensitive applications stored locally on the mobile phone and the sensitive applications being automatically secured by preventing the mobile phone from running the sensitive applications;
   locally detecting a security event on the mobile phone while operating the mobile phone in the guest mode; and
   in response to locally detecting the security event on the mobile phone, automatically switching back to operating the mobile phone in the owner mode, the automatic switching back to operating the mobile phone in the owner mode resulting in automatically unsecuring the sensitive data stored locally on the mobile phone.

2. The method of claim 1, wherein the insecurity event further comprises receipt, from a user local to the mobile phone, of an authenticated request to place the mobile phone in the guest mode.

3. The method of claim 1, wherein the sensitive data further comprises sensitive files stored locally on the mobile phone.

4. The method of claim 3, wherein the sensitive files are automatically secured by at least partially encrypting the sensitive files.

5. The method of claim 3, wherein the sensitive files are automatically secured by modifying file permissions of the sensitive files.

6. The method of claim 1, wherein the security event comprises insertion of an authorized SIM card into the mobile phone.

7. The method of claim 1, wherein the security event comprises receipt, from a user local to the mobile phone, of an authenticated request to place the mobile phone in the owner mode.

8. One or more non-transitory computer-readable media comprising one or more computer-readable instructions that, when executed by one or more processors of a mobile phone, cause the mobile phone to:

operate a mobile phone in an owner mode;

locally detecting an insecurity event on the mobile phone, the insecurity event comprising removal of an authorized Subscriber Identity Module (SIM) card from the mobile phone and the mobile phone losing network connectivity while the mobile phone remains powered on;

in response to locally detecting the insecurity event on the mobile phone, automatically switching to operating the mobile phone in a guest mode, the automatic switching to operating the mobile phone in the guest mode resulting in automatically securing sensitive data stored locally on the mobile phone, the sensitive data comprising sensitive applications stored locally on the mobile phone and the sensitive applications being automatically secured by preventing the mobile phone from running the sensitive applications;

locally detecting a security event on the mobile phone while operating the mobile phone in the guest mode; and in response to locally detecting the security event on the mobile phone, automatically switching back to operating the mobile phone in the owner mode, the automatic switching back to operating the mobile phone in the owner mode resulting in automatically unsecuring the sensitive data stored locally on the mobile phone.

9. The one or more non-transitory computer-readable media of claim 8, wherein the insecurity event further comprises receipt, from a user local to the mobile phone, of an authenticated request to place the mobile phone in the guest mode.

10. The one or more non-transitory computer-readable media of claim 8, wherein:

the sensitive data further comprises sensitive files stored locally on the mobile phone; and the sensitive files are automatically secured by at least partially encrypting the sensitive files or by modifying file permissions of the sensitive files.

11. The one or more non-transitory computer-readable media of claim 8, wherein the security event comprises one or more of:

insertion of an authorized SIM card into the mobile phone; and receipt, from a user local to the mobile phone, of an authenticated request to place the mobile phone in the owner mode.

12. A mobile phone comprising:

one or more processors;

one or more non-transitory computer-readable media comprising one or more computer-readable instructions that, when executed by the one or more processors, cause the mobile phone to:

operate a mobile phone in an owner mode;

locally detect an insecurity event on the mobile phone, the insecurity event comprising removal of an authorized Subscriber Identity Module (SIM) card from the mobile phone and the mobile phone losing network connectivity while the mobile phone remains powered on;

in response to locally detecting the insecurity event on the mobile phone, automatically switch to operating the mobile phone in a guest mode, the automatic switching to operating the mobile phone in the guest mode resulting in automatically securing sensitive data stored locally on the mobile phone, the sensitive data comprising sensitive files stored locally on the mobile phone and the sensitive files being automatically secured by at least partially encrypting the sensitive files or by modifying file permissions of the sensitive files, the sensitive data further comprising sensitive applications stored locally on the mobile phone and the sensitive applications being automatically secured by preventing the mobile phone from running the sensitive applications;

locally detect a security event on the mobile phone while operating the mobile phone in the guest mode; and in response to locally detecting the security event on the mobile phone, automatically switch back to operating the mobile phone in the owner mode, the automatic switching back to operating the mobile phone in the owner mode resulting in automatically unsecuring the sensitive data stored locally on the mobile phone.

13. The mobile phone of claim 12, wherein the insecurity event further comprises receipt, from a user local to the mobile phone, of an authenticated request to place the mobile phone in the guest mode.

14. The mobile phone of claim 12, wherein the security event comprises:

insertion of an authorized SIM card into the mobile phone; or receipt, from a user local to the mobile phone, of an authenticated request to place the mobile phone in the owner mode.

15. The method of claim 1, wherein the insecurity event comprises removal of the authorized SIM card from the mobile phone while the mobile phone remains powered on.

16. The one or more non-transitory computer-readable media of claim 8, wherein the insecurity event comprises removal of the authorized SIM card from the mobile phone while the mobile phone remains powered on.

17. The mobile phone of claim 12, wherein the insecurity event comprises removal of the authorized SIM card from the mobile phone while the mobile phone remains powered on.

* * * * *